SELECTIVE LOCKOUT OF COMPUTER MEMORY

Filed June 22, 1962 7 Sheets-Sheet 1

INVENTOR
*DUANE H. ANDERSON*
BY
ATTORNEY

| ESTABLISH ZONE OF LOCKED-OUT ADDRESSES | STORE X AT MEMORY ADDRESS u + Bb | MEMORY LOCKOUT |
|---|---|---|
| TRANSMIT $F_{OL}$ TO $W_3$<br><br>I A TO R<br>R TO M.L.O. | TRANSMIT $F_{OL}$ TO $W_3$<br>TRANSMIT Bb TO $W_1$<br><br>I A TO R<br>R TO $S_1$ and INITIATE MEMORY (if no lockout)<br><br>X TO $Z_1$ (if no lockout) | R TO COMPARE<br>CHECK FOR LOCKOUT<br>GENERATE INTERRUPT |

July 26, 1966 D. H. ANDERSON 3,263,218
SELECTIVE LOCKOUT OF COMPUTER MEMORY
Filed June 22, 1962 7 Sheets-Sheet 3
Fig. 4
| A | B | C |
|---|---|---|
| 0 | 0 | 1 |
| 0 | 1 | 0 |
| 1 | 0 | 0 |
| 1 | 1 | 0 |
Fig. 5
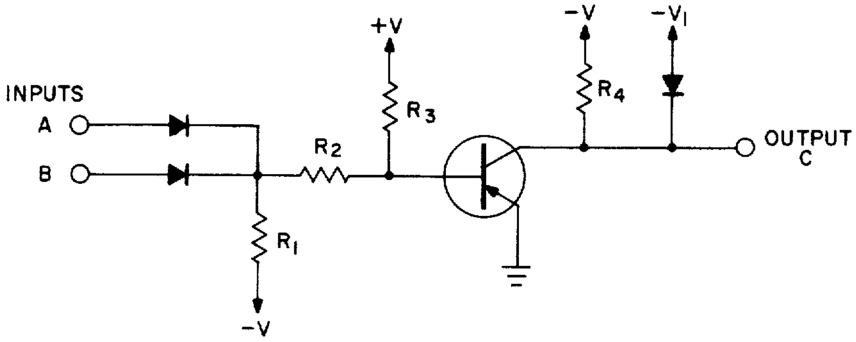
Fig. 6
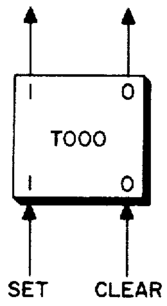
Fig. 7
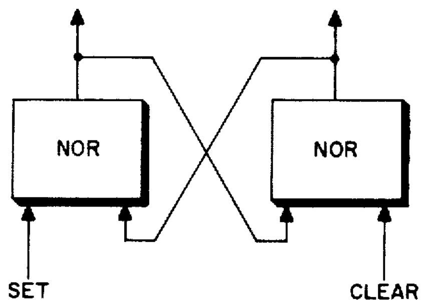
Fig. 8

SELECTIVE LOCKOUT OF COMPUTER MEMORY

Filed June 22, 1962

United States Patent Office 3,263,218

Patented July 26, 1966

3,263,218

SELECTIVE LOCKOUT OF COMPUTER MEMORY

Duane H. Anderson, Roseville, Minn., assignor to Sperry Rand Corporation, New York, N.Y., a corporation of Delaware Filed June 22, 1962, Ser. No. 204,411
6 Claims. (Cl. 340—172.5)

This invention relates generally to a stored program type of digital computer having an addressable memory section, the contents of which are selectively alterable. More particularly, this invention relates to programmably preventing the alteration of the contents of the memory section contained in specified addresses.

The operation of a stored program digital computer is controlled by a series of machine instruction words which are stored in a plurality of respectively different addressable memory registers. Each of the instruction words includes at least a function code portion which designates a particular function to be performed by the computer in response to the the function code. The program control is effected by calling out the instruction words in a certain sequence so that each of the individual functions designated by the respective function code portions are performed in a definite sequence to achieve the overall end results. A great degree of versatility is achieved in machines of this nature by making the contents of the memory section selectively alterable so that the program itself can be self-modifying by including within the series of machine instruction words some instruction words which have a function code designating a memory alteration, more commonly referred to as a write or store operation. Further, a memory section in which the contents are selectively alterable can be utilized to store various data such as results of arithmetic operations which can be replaced by new data when retention of the older data is no longer necessary. The versatility and other advantages of incorporating a selectively alterable memory section in a stored program computer is well known in the art, and the foregoing is only intended to briefly point out some of the more obvious advantages.

In many instances it is mandatory that during the course of computer operation certain information stored in the memory section should not be altered. For example, a set of data may be stored in a plurality of memory registers in a manner to comprise a table for use in an operation such as a table lookup. If any part of this data were to be altered in the course of the computer program, results of a table lookup operation would be erroneous and the operation would have to be repeated after the information or data in its original form had been restored in the memory. Another example is in the use of a series of machine instruction words stored in the memory section comprising a subroutine which should not be altered in any manner. Therefore, it is a primary general object of this invention to prevent the alteration of information stored in a selectively alterable memory section.

In the past, in order to insure that certain information stored in the memory was not altered during the course of the program operation, the machine operator or programmer would include an instruction word or a set of instructions in his program which would monitor the program operation to determine if the program contemplates alteration of information which should not be altered. This, of course, consumes computer operation time which is highly critical in present day high-speed processing operations. Furthermore, if any subroutine includes an instruction word in which the function code designates a memory alteration the subroutine would have to include an instruction or series of instruction to perform the above described checking operation. In general, computer programs include a large number of subroutines many of which require a store function. This, of course, multiplies the wasteful use of computer operation time. It is a further object of this invention to provide for monitoring a computer program to determine if information stored at specified addresses or locations in the memory section is to be altered, with negligible increase of the computer operational time.

A further object of this invention, in relation to the immediately preceding object, is to prevent the alteration of the information stored at those specified addresses. A system that has been employed in the past to prevent the alteration of information stored in the memory section at certain addresses therein has been one in which these certain addresses are locked out during the course of any memory alteration function. This is accomplished by predetermining which addresses should be locked out and presetting means for locking out these addresses. The disadvantage of this system is that during the course of the computer program, these certain addresses are locked out in a fixed manner and therefore some of the versatility of the selectively alterable memory of a digital computer is lost.

It is a further object of this invention to selectively prevent the alteration of information stored in specified memory locations during the course of the computer program.

In the instant invention there is incorporated into the computer program a machine instruction word which has a function code portion designating memory lockout and including a further coded portion designating at least in part the addresses to be locked out. In response to this instruction word, which is originally stored in the memory section and which is called out of memory in program sequence, a zone of locked-out addresses is established. All machine instruction words which include a function code portion designating a memory alteration subsequently called out of the memory section in the program controlled sequence are subjected to a test to determine if the address location of the information to be altered is within the zone of locked-out addresses. If it is within that zone, the memory alteration is prevented. Since the instruction word which establishes the zone of locked-out addresses is part of the computer program and is stored in the selectively alterable memory section, the program itself can change the zone-establishing portion of the latter instruction word so that the zone of locked-out addresses is programmably changeable. This latter feature provides flexibility and versatility in controlling the computer operation to selectively prevent memory alteration.

These and other more detailed and specific objects and features will be disclosed in the course of the following specification, reference being had to the accompanying drawings, in which:

FIG. 4 shows the block symbol of a NOR circuit utilized as the basic logical element in the described embodiment of this invention;

FIG. 5 is the truth table for the NOR circuit;

FIG. 6 is an illustrative electrical schematic of the NOR circuit;

FIG. 7 shows the block symbol of a flip-flop;

FIG. 8 shows the flip-flop in greater detail as comprising a pair of cross-coupled NOR's;

*General definitions and comments*

The following detailed description will be in reference to a binary computer. From the description contained herein, the adaptability of this invention to other computing devices other than binary computers to achieve the objects and features in the novel manner as described will become obvious.

Throughout the description reference is made to instruction words, operands, command signals, and the like. For the purposes of the specification and the claims, it is understood that in the apparatus described these items are represented by signals.

The use of the term "word" is well known in the computer art, and therefore no detailed definition is required. Suffice is to say that a binary word, whether it be an instruction word, an operand or the like, consists of a set of binary valued digits each in respectively different bit orders. Furthermore, in conjunction with the immediately preceding paragraph, it is understood that there are signal representations of the binary vlaues of the respective digits and in the computing device described for illustrative purposes herein, an electrical signal of a relatively negative level represents a binary "0" and an electrical signal of a relatively positive level represents a binary "1."

Figure 1:
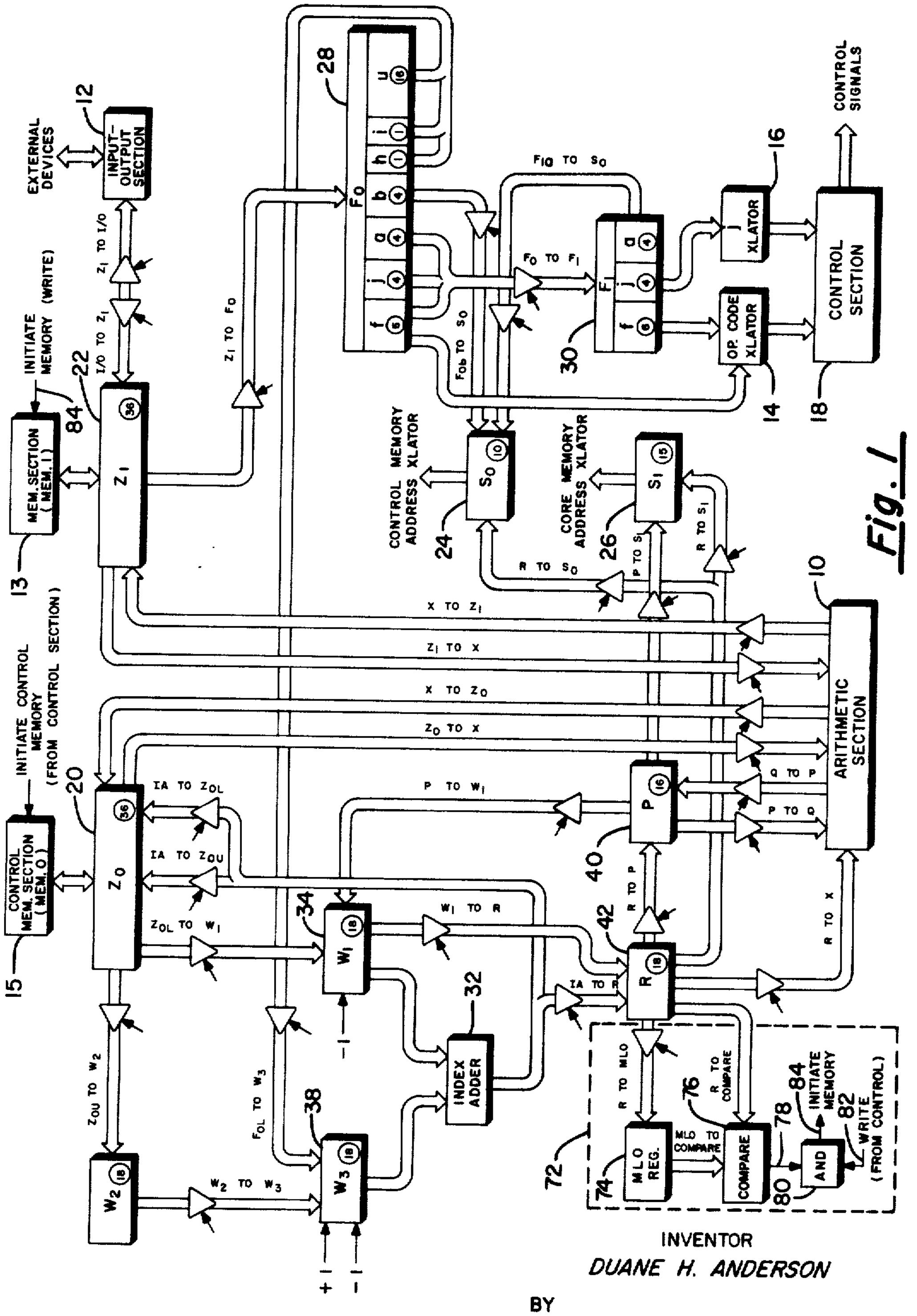
FIG. 1 is a general block diagram of a digital computer incorporating an embodiment of the instant invention.

The instruction word is a binary word which includes at least one group of bits, the coded permutations of which determine the particular function to be performed by the computing device in response to the instruction word. This group of bits is referred to as the function or operation code. The exact format for an instruction word in any given digital computer is, of course, dependent upon the particular design of the computer, and is a matter of choice. For illustrative purposes the format of the instruction words utilized in the computing device shown in FIG. 1 is shown and described below. This instruction word is a 36 bit word with the leftmost bit position, 35, being the most significant bit position, and the rightmost bit position, 00, being the lowest order bit position. In the format shown below, each bit or group of bits which in combination comprise a particular designator, are grouped and labeled according to the respective designators.

INSTRUCTION WORK

| *f* | *j* | *a* | *b* | *h* | *i* | *u* |
|---|---|---|---|---|---|---|
| 35–30 | 29–26 | 25–22 | 21–18 | 17 | 16 | 15–00 |

The six highest order bits, 35–30 labeled *f*, comprise the coded permutations of the function or operation code of the instruction word. The coding in these six bits determines the basic function of the instruction word and by translation of these six bits, control signals are developed to be applied to the logical circuitry of the computer to effect the particular coded function.

The *j* designator, comprising bits 29–26, is utilized in various manners in different instructions, and for the purposes of the instant invention, the *j* designator may provide further coding and may constitute a part of the function code portion of the instruction word. The sixteen lowest order bit positions, 15–00, and labeled *u*, in general comprise the coded permutations of a base address of an operand or alternatively may be an operand.

The four bits contained in the locations 21–18 labeled *b* designator, in general are utilized to modify *u* when the latter is a base address. Although the use of the *b* designator is not considered a part of the instant invention, it will be referred to in the course of the following description and its function briefly described.

The *a*, *h* and *i* designators are not pertinent to the instant invention.

A computer program consists of a plurality of instruction words which are placed in operative control of the computer in a certain program sequence. A computer incorporating an internally stored program has the set of program instructions stored somewhere in the computer proper, for example, in the addressable memory section, and includes means for calling out these instruction words in their proper sequence from the storage locations. In general, the order of sequence is partly determined by having the instruction words stored in successively ascending address locations in the memory. However, to achieve versatility and flexibility, often the program includes instruction words which cause the sequence to pump to other memory locations, for example in the performance of subroutines, and further instruction words which return the program sequence to the successive ascending addresses.

*General description of FIG. 1*

The illustrative digital computer shown in FIG. 1 incorporating the instant invention is also shown, except for that portion boxed off by broken lines in the lower left of FIG. 1, in my copending application on "Computing Device Incorporating Interruptible Repeat Instruction" Ser. No. 167,728, now United States Patent 3,168,724, filed January 22, 1962, and assigned to the same assignee of the instant application, and is described in detail therein. FIG. 1 shows the principle essential sections of a digital computer including the Arithmetic Section 10, and Input-Output Section 12, a Memory Section 13, a Control Section 18, a Control Memory Section 15, a multiplicity of temporary storage registers for holding information essential for computer operation or information which is operated upon by the computer, and a plurality of transmission paths intermediate the various registers and the primary sections. The Input-Output Section 12, the Arithmetic Section 10, the Control Memory Section 15, along with their respectively associated registers and transmission paths, are not considered pertinent to the instant invention and so will not be described in any detail hereinafter. The transmission paths between the registers and the various other sections of the computing device of FIG. 1 are appropriately labeled and are shown in cable form to indicate that all transmission is done in a parallel mode, that is, all bits of a register or portions thereof are transmitted simultaneously. Most of the transmission paths are gated, as indicated by the triangle symbol in the gated transmission paths. The direction of propagation in the transmission paths is indicated by the orientation of the triangle. The gates are enabled by control signals applied thereto which are represented by arrows. These control signals in general are developed by the Control Section 18.

There will now be described briefly the general sequence of events and the flow of information in the device of FIG. 1 which, in general, are included in normal computer operation. The P register 40, often referred to as the Program Address Counter, is initially set to some binary value. This value is then transferred to the $S_1$ Register 26, which is often referred to as the Storage Address Register. Substantially concurrently, the contents of the P Register are transmitted to the $W_1$ Register 34 while the $W_3$ Register 38 is set to the +1 state and the contents of $W_3$ and $W_1$ are combined in the Index Adder 32 and from there are transmitted to the R Register 42 and in turn returned to the P Register. This serves to increment the original contents of the P Register by one so that the next storage address transmitted to the $S_1$ Register from P will be the next successive address in the memory section. The contents of $S_1$ are translated by a memory address translator, not shown, to select a specific one of a plurality of addressable storage registers in the Memory Section 13. At the same time, the Memory Section 13 is initiated or activated to read or call out the information stored in said addressed register of the Memory Section and that information is transmitted to the $Z_1$ Register 22, referred to as the Memory Transfer Register. Considering this information which is called out to be the first instruction word of a program, it is transferred to the Function Register $F_0$ labeled 28, and is at least temporarily held in the Function Register. The function or operation code of the instruction word is transmitted to the Operation Code Translator 14 and to a second level of Function Register $F_1$, labeled 30. $F_1$ is provided so that if in the course of the program it is desirable to insert a new instruction word into the register $F_0$ before the previously called out instruction word has completed its instruction cycle, at least the function code portion of the previously called out instruction word will still be available. The Operation Code Translator output is transmitted to the Control Section 18 which in response thereto develops a plurality of individual control or command signals in proper sequence according to the particular function designated by the function code of the instruction word. These control signals in general are those which enable the various transmission paths. At least the function code portion of the instruction word is retained throughout the instruction cycle. When the function designated by the function code has been performed this terminates the instruction cycle and the next subsequent program instruction word is obtained from the Memory Section in the same manner as described above.

Assume the instruction word obtained from Memory specifies the function of altering the contents of the memory section by storing or writing information into the Memory Section. With an instruction of that nature the function code portion contained in the Function Register is decoded in the Translator 14 which causes the Control Section to develop a plurality of control signals including a signal enabling the transmission of the address-representing portion, *u*, of the corresponding instruction word from the Function Register to the $W_3$ register 38. The coded permutations of *u* may be modified by the Index Adder 32, and transmitted to the R Register 42. From there the information is transmitted to the $S_1$ Register 26 and a further control signal initiating the memory is developed and applied to the Memory Section 13. Concurrently, the information which is to be stored in the Memory Section is transmitted to the $Z_1$ Register 22 so that the information is stored in the memory storage register located at the address designated by the contents of the $S_1$ Register.

*Memory section*

Although computer memory sections are generally well known in the art, some essential features and characteristics of the memory section with which the instant invention is utilized will be described. The instant invention is applicable only to those memory sections in which the stored contents are selectively alterable, as distinguished from memory sections classified as permanent storage memories. In the former, during the course of program operation and under the control of instruction words, information can be written or stored into the memory section and information previously stored therein can be modified or altered as desired. In the permanent type of memory section, the information is fixedly stored, for example, by permanent wiring, and is not alterable except by mechanical means such as by insertion and deletion of jumper wires in a plug board. Since the contents of a non-alterable memory section are not changeable in the course of program operation, this latter type of memory is not adaptable for use with the instant invention.

Another essential feature of the operation of the memory section applicable to the instant invention is that the information is stored in addressable registers within the memory section. This means that in order to access the memory, that is to either obtain information therefrom or to store information therein, an address selection code must be applied to the memory section to reference a specified location.

For illustrative purposes, with no limitation thereto intended, the memory section of the computing device of FIG. 1 besides incorporating the essential features described in the immediately preceding paragraph, is a random-access, coincident current magnetic-core memory of the destructive-readout type. This type of memory section is well known in the art but will be briefly described.

In general, toroidal bistable magnetic cores are arranged in an array of rows and columns on a plurality of planes. Each row has a drive wire, magnetically coupled to all of the cores in the row, and each column has a drive line magnetically coupled to all of the cores in the respective columns. A sense line is magnetically coupled to all of the cores in a single plane. By selecting one of the row and one of the column drive lines in a plane and applying a pulse of current to each, a magnetic field is developed at their intersection to switch the core located at the intersection. The applied magnetic field is such that for reading-out purposes the selected core is driven to its arbitrarily designated binary "0" representing state. If the core originally had been in the "0" state, a negligible signal will be induced on the sense line coupled thereto whereas if the core had originally been in the arbitrarily designated binary "1" state, a substantial signal will be induced in the sense line when the core is switched to the "0" state. Since during readout the stored information is destroyed in the selected cores, it is necessary to restore this information so that it is retained in the memory section. To effect this a memory access cycle includes a restore or writing step following the reading step. The information which is read-out of a set of cores is rewritten into these same cores during the restore step. The memory reference cycle, including both the reading and the restore steps, is initiated by the control section of the computer in response to an instruction word which contains the function code portion which designates a memory reference. If the particular instruction word does not require a reading operation and only designates a writing or storing operation, for example, in storing the results of an arithmetic operation in a particular address in the memory section, a full memory access cycle is initiated. However, in the latter case, the information read out of the particular memory location is not utilized and during the restore step new information is placed in the memory section at the designated address. The storing or writing step utilizes the same row and column drive lines mentioned above to drive the selected magnetic cores, those corresponding to the location as designated by the address portion of the instruction word, to the proper binary signal storing state. It should be understood that the instant invention is equally applicable to other types of memory sections, for example, those utilizing addressable magnetic drums or discs, and electrostatic storage systems. To implement the foregoing, there is required a storage address register which contains the coded representation of the selected memory location, a memory transfer register which receives the information read out of the memory address and holds the information which is to be stored in the memory address, and a memory accessing control circuit which develops the read and write current pulses in their proper sequence in the memory access cycle. The latter, of course, is initiated by a memory initiate signal from the control section of the computer.

Since the embodiment of this invention will be described in relation to the computing device shown in general block diagram form of FIG. 1, the addressing scheme for the Memory Section of said computing device will now be briefly described. The Memory Section comprises two banks of cores, each bank capable of storing 32,768 words of 36 bit length in respectively different memory registers. For purposes of explanation and illustration, the address locations of the registers in core bank No. 1 range from 000000 to 077777 (octal) and the address locations of the registers in bank 2 range from100000 to 177777 (octal). It can be seen then that if the leftmost bit of the 16 bit address-designating binary number, described above in octal is a "1," the particular memory storage register is located in memory bank 2, whereas if the leftmost bit is a "0," the register is located in core bank 1.

*Address modification*

In my copending application, supra, there is described in detail means for modifying the address portion of an instruction word. Although address modification is not considered a part of the instant invention, it does arise in the normal course of program operation in response to some of the instruction words and therefore will be briefly described. In particular instruction words which are contained in the $F_0$ Register 28, the lower half address-designating portion of the word is transmitted to the $W_3$ Register via the transmission path labeled $F_{0L}$ to $W_3$ upon generation of the proper control signal in the Control Section 18 which enables this transmission path. Substantially concurrent therewith, the contents of a register containing previously stored information, referred to as the B register (which is a particular address location in the Control Memory Section 15 with the address designated by *b* in the instruction word) is received by the $W_1$ Register 34 from the Control Memory Section Information Transfer Register $Z_0$ through the transmission path $Z_{0L}$ to $W_1$ when enabled by another control signal from the Control Section. The contents of these two registers, $W_3$ and $W_1$, are combined in the Index Adder 32 and the result is transmitted to the R Register 42 and from there to the $S_1$ or $S_0$ Registers, depending on the particular instruction word and the control signals developed in the Control Section in response to said instruction word. With or without modification, the address designating portion of the instruction word is transmitted to the R Register via the $W_3$ Register and the Index Adder.

*Memory lockout method*

The previous paragraphs which follow the listing of figures are included to provide background for the detailed description of the instant invention.

Figures 2, 3:
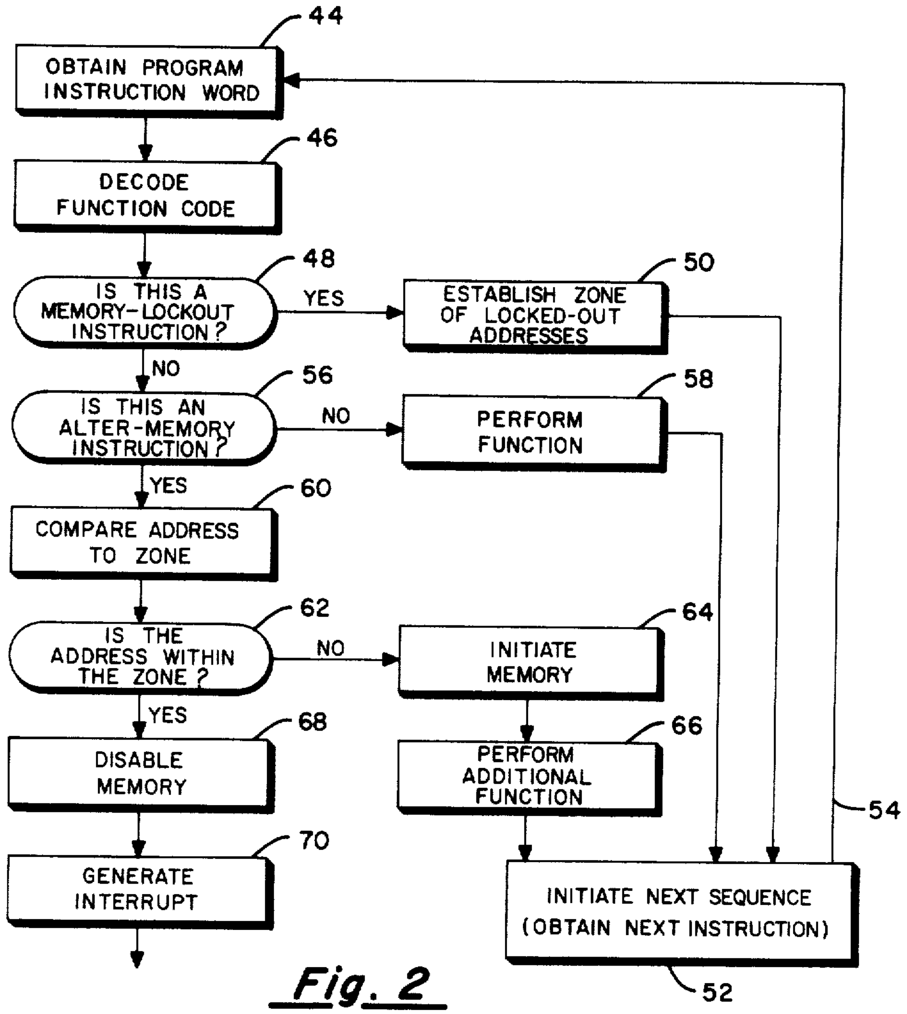
FIG. 2 is a flow chart diagram showing the functional steps of the instant invention.
FIG. 3 is a tabular listing of the essential command signals generated by the Control Section of the computing device shown in FIG. 1 necessary to effect the operation of the embodiment of this invention.

FIG. 2 describes the method of the instant invention in a flow chart form. The two symbols utilized in the flow chart are a rectangular box which signifies that an actual operation is performed and an oblong symbol which represents a decision-making step. Although the chart of FIG. 2 is intended to show the sequence of events, it should be recognized that in some instances some of the events could occur concurrently. This will become more obvious from the following description.

Starting at the top of the diagram of FIG. 2, the initial step as described at 44 is to obtain the program instruction word. As previously stated, this is the normal course of program operation and is implemented in a computing device by obtaining the program instruction words from the Memory in a predetermined sequence and placing them in the Function Register. Following this the function code portion of the instruction word is decoded, as shown at 46, to determine which particular function is designated by the instruction word. At 48 the first decision is made resulting from the decoding of the function code to determine whether the particular instruction is a memory lockout instruction or not. The coding of the memory lockout instruction word utilized in the illustrative embodiment of FIG. 1 will be subsequently described in detail. Suffice it to say at this juncture that a memory lockout instruction word contains a particular unique coding in its function code portion which can be recognized in the decoding step. There are two possible paths from this first decision-making step, and following the "yes" path which indicates that the instruction is a memory lockout instruction, the function of establishing a zone of locked out addresses is initiated as shown at 50. The particular control signals required to perform this function in the embodiment of the invention shown in FIG. 1 will be subsequently described in detail but for the purposes of the method of operation the zone can be established in any desired manner. It should be noted that the zone is established in response to a particular unique instruction word which is part of the computer program. The completion of the establishment of this zone by the memory lockout instruction word terminates the instruction cycle for that particular word and so another sequence of events is initiated as shown in FIG. 2 at 52. As previously stated, since the program comprises a series of instruction words which are obtained in predetermined sequence, the purpose of the initiation of the next sequence is primarily to obtain the next program instruction word, which is indicated by line 54 feeding back from 52 to 44, to indicate a closed loop operation.

The next successive program instruction word is obtained and decoded and the decision is made at 48 to determine whether or not it is a memory lockout instruction. Assuming that it is not, the path labeled "No" is followed and another decision must be made to determine if the present instruction is one which will be utilized to alter information in the memory, such as a store or write instruction. An illustrative coding for a store instruction as utilized in the computer of FIG. 1 will subsequently be described in greater detail. The decision at 56 then determines which path will be followed, and assuming that the instruction word is not one which alters the memory, the "No" path to the perform function 58 is taken so that the function designated by the function code portion of the instruction word will be performed and upon completion, at the close of the instruction cycle, the next sequence is initiated by obtaining the next instruction of the program. If the decision at 56 is "Yes" (the present instruction being a memory-altering instruction) the address at which information is to be written is compared to the previously established zone of addresses at 60. This decision at 62 resulting from the comparison is the determination whether or not the memory reference address lies within the zone previously established. If it does not, it is therefore referencing a non locked-out address so that the memory section reference may be initiated, as shown at 64, and any further function to be performed under control of the particular instruction word is undertaken as shown at 66. Upon completion of the instruction cycle the next program instruction is obtained by initiating the next sequence. If the decision at 62 is that the memory reference address is within the zone of locked-out addresses, the memory is disabled, as shown at 68, so that the information stored at that particular address will not be altered. Additionally, in general, an interrupt signal is generated, as shown at 70, and this signal can serve different purposes. One obvious function of an interrupt signal developed in this manner is to activate an alarm system to give either a visual or audible signal indication that an attempt was made to reference a locked-out address. A further use of the interrupt signal is to initiate a previously stored subroutine comprising a further series of machine instruction words which will result in some corrective action being taken by the computer so that it can continue its data processing. The generate interrupt operation at 70 is not shown as part of a closed loop to initiate the next sequence since the use of the interrupt signal is a matter of choice which generally does not involve continuation of the same computer program without prior corrective action.

The versatility and flexibility of the instant invention can probably be best pointed out and explained in relation to the flow diagram of FIG. 2. Assuming that early in the program there is a memory lock-out instruction which establishes the zone of locked-out addresses as functionally described above. Further assume that in the course of the program it is desirable to change this zone. To effect this, a store instruction can be included in the program to alter that portion of the memory lockout instruction word which is utilized to define the limits of this zone. Then the memory lockout instruction word can be once more obtained and through the steps of 44, 46, 48 and 50 of FIG. 2 it will establish this new zone of locked-out addresses, while allowing continuation of the computer program. In this manner the memory lockout zone is not only programmably established but furthermore is programmably alterable.

*Apparatus embodiment of invention*

The program controlled operation of the illustrative computing device of FIG. 1 was described above. Apparatus comprising an embodiment of the instant invention utilizable with said computing device to effect the improvement stated in the objects and features is shown at the lower left of FIG. 1 enclosed by broken line 72. The contents of R Register 42 are transmitted to the Memory Lockout (MLO) Register 74 via transmission path labeled R to MLO. This latter transmission path is gated by a control signal generated by the Control Section 18, referred to as the R to MLO control signal which is indicated by the arrow input to the triangularly symbolized gating circuit. Compare Circuit 76 receives inputs from both the MLO Register 74 and the R Register 42 via the appropriately labeled transmission paths and provides a signal output indicative of the results of the comparison at 78. The two input AND circuit 80, which can be any type of circuit well known in the art, for example, a well known diode AND circuit, receives a first input from the Compare Circuit 76 via line 78 and a second input from Control Section 18 labeled "write" on input line 82 and develops a signal output in response to said inputs on line 84. This latter signal line is also shown towards the top of the figure as an input to Memory Section 13 which effects an initiation of the memory accessing cycle.

The steps involved in the establishment of the zone of locked-out addresses utilizing the apparatus shown in FIG. 1 are listed in sequential order at the lefthand side of FIG. 3 in a tabular form. Assuming that a memory lockout instruction has been obtained from the Memory Section 13 and placed in the Function Register 28, in normal program sequence, the function code portion and the *j* designator portion are decoded in the Operation Code Translator 14 and the *j* Translator 16 and applied to the Control Section 18. In response to the sensing by the translator sections that the instruction word is a memory lockout instruction, the Control Section develops a control signal to enable the gate in the $F_{0L}$ to $W_3$ transmission path to allow the transmission of the *u* portion of the corresponding instruction word still in the Function Register to be transmitted to the $W_3$ register 38. The information in the $W_3$ register is transmitted to the Index Adder 32 via a gated transmission path. In proper sequential order, the Control Section 18 develops a further control signal to enable the transmission path labeled IA to R so that the unmodified output of the Index Adder is transmitted to the R Register. A still further control signal is developed by the Control Section to enable the transmission path R to MLO to place in the Memory Lockout Register 74 the information which constituted the memory address-designating portion of the memory lockout instruction word. Although the contents of the R Register 42 as well as the contents of the MLO Register 74 are transmitted to the Compare Circuit 76, since the transmission paths thereto are not gated, the resulting signal output from the Compare Circuit appearing on line 78 is of no consequence since no signal input to AND circuit 80 is applied via write line 82. The immediately foregoing is a more detailed description of one portion of the flow chart of FIG. 2 and because of the closed loop operation indicated in the flow chart, the instruction cycle of the memory lockout instruction word is terminated and the next sequence is initiated by obtaining the next program instruction.

Assume the next program instruction is one designating, by its function code, a memory alteration such as a store or write operation. For illustrative purposes, assume the instruction is Store X at Memory Address $u+Bb$. This latter instruction is called out from the Memory Section and placed in the Function Register 28 and the *f* portion of the instruction word is translated by the Operation Code Translator 14 and transmitted to the Control Section 18 in the same manner as described relative to the memory lockout instruction word. The tabular listing of FIG. 3 indicates that the memory address-designating portion of this instruction word as contained in the *u* portion thereof is transmitted to the $W_3$ Register via the gated transmission path $F_{0L}$ to $W_3$ in response to the gate enable signal developed by the Control Section 18. Substantially concurrently with the latter transmission, the coded *b* designator portion of the instruction word is transmitted to the $S_0$ Register 24 in response to a gate enable signal from the Control Section. This serves to call out of the Control Memory Section 15 an address modifier which is transferred from the Control Memory Section Transfer Register $Z_0$, labeled 20, to the $W_1$ Register 34 via the enabled transmission path therebetween. The Index Adder combines the two sets of information contained in the $W_3$ and the $W_1$ Registers to modify the address designating portion of the corresponding instruction word and transmits this modified address designator to the R Register 42 in response to an enabling signal generated by the Control Section. The normal course of events, prior to the inclusion of the instant invention, was to provide control signals in proper sequential order from the Control Section to enable the transmission of the address information from the R Register 42 to the Storage Address Register $S_1$, 26 and to initiate a memory reference cycle to alter the information contained in the memory register as designated by the address information in the $S_1$ Register. Since the exemplary instruction word utilized comprehends the storing of the contents of the X Register at a particular memory address, a further control signal is developed to transmit information from the X Register, which is a part of the Arithmetic Section 10, to the Memory Transfer Register 22 so that during the write portion of the memory access cycle the information in Register $Z_1$ is written into that particular memory register address. However, referring back to the R Register 42, it can be seen that the address designating information is transmitted to the Compare Circuit 76 in addition to being transmitted to the $S_1$ Register 26. In the Compare Circuit the contents of the MLO Register 74 are compared to the address designating portion of the instruction word in the R Register and the results of this comparison appears on output line 78 and is inputted to AND circuit 80. The initiate Memory signal from the Control Section, which initiates the memory access cycle, is applied as the second input to AND circuit 80 via the input line 82. The output line 84 from AND circuit 80 will provide a signal input to the Memory Section 13 to initiate the memory access cycle only if the contents of the MLO Register and the address designating portion, as modified, of the corresponding memory alteration instruction word bear a certain relationship to one another. This relationship generally is that the address desired to be accessed is outside a particular zone of locked-out memory addresses previously established and determined by the contents of the MLO Register. If the designated address is within the locked-out zone, the AND circuit 80 is not enabled so that the memory initiate signal is inhibited. Further, the absence of a memory initiate signal at this time results in a further signal indication generally referred to as an Interrupt signal. One function of the Interrupt signal is to initiate a previously stored subroutine to effect some corrective action so that the computer operation may be continued. Another function of the interrupt signal is to operate an indicator to give a visual indication to the computer operator that a memory lockout has occurred. Of course, another use of the interrupt signal would be to terminate the computer operation.

It can be seen that since the computer can be programmably controlled by a memory alteration instruction word that the memory lockout instruction, which is one of the instructions of the program, can have its zone-establishing portion altered by the computer program. As previously described, assuming no memory lockout signal is developed, the information transmitted from the X Register in the Arithmetic Section to the $Z_1$ Register 22 can be used to alter at least a portion of the memory lockout instruction word by placing in the $S_1$ Register 26, the address location of said memory lockout instruction word.

*Program instruction words*

The general format of an illustrative instruction word has been previously described. To describe in detail the operation of the instant invention, two particular instruction words will be described using the coded permutations required by the illustrative computing device of FIG. 1. It should be understood that the coding is a matter of choice depending on the particular computing device which incorporates the invention and the following is intended to be illustrative and not limitive.

The first program instruction word is the memory lockout instruction with *f* equal to 72 (octal), *j* equal to 11, (octal) and *u* equal to 000227 (octal). Since the value of the *a, b, h* and *i* designators are not pertinent to the memory lockout instruction their values will not be considered.

The other program instruction word to be considered in describing the operation of the instant invention is the Store X instruction. The function of the instruction word is to store the contents of the X Register (which is in the Arithmetic Section) in a specified memory address which address is designated at least in part by the *u* portion of instruction word. The octal representation of this instruction word is 010011050000. Breaking this down to designator portions, *f* is equal to 01 (octal), *j* and *a* are equal to 00 (octal), *b* is equal to 11 (octal), *h* and *i* are equal to 0, and *u* is equal to 050000 (octal).

Assume that the above two instruction words are included as part of a previously stored program of machine instruction words with the memory lockout instruction occurring sequentially prior to the Store X instruction word. Further assume that the computing device is in normal program controlled operation. The memory lockout instruction is called out of the Memory Section and placed in the Function Register. The Operation Code Translator 14 and the *j* Translator 16 sense *f* equal to 72 and *j* equal to 11 and transmit signal representations of this to the Control Section 18. The latter develops a first control signal to gate the transmission of the *u* portion of the memory lockout instruction to the $W_3$ Register 38 and this in turn, through the Index Adder 32, is applied to the R Register 42 with the properly generated control signal gating this latter transmission path. A further control signal, in proper time sequence, enables the R to MLO transmission path to place in the MLO Register 74 the *u* portion of the memory lockout instruction word. At this time then the memory lockout register contains the binary number 0000000010010111 with the left-most bit being the highest order bit in stage 15 of the MLO Register and the right-most bit being the lowest order bit, 00, of the 16 bit MLO Register. The four lowest order bits of, the word in the MLO Register, appearing in bit positions 00–03, are respectively of binary values 1, 1, 1 and 0. This is equal to decimal seven and, in a manner to be described subsequently in greater detail, defines a lower limit of a zone of memory addresses. The four bits contained in the next four higher order positions, positions 04–07, which are respectively of binary values 1, 0, 0 and 1, which is equal to decimal nine, defines an upper limit of a zone of memory addresses. In this illustration, if selected four bits of an address designating portion of an instruction word lies within the range defined by said upper and lower limit defining portions of the MLO Register, then a memory reference in response to a memory alteration function is permitted to be initiated. This means that if the selected four bits of the subsequent address designating word is equal to 7, 8, or 9 decimal the particular storage address can be accessed whereas if the same four bits are of a decimal value less than 7 or greater than 9 the memory initiate signal is inhibited.

The placing of the number in the MLO Register in response to the memory lockout instruction, which number establishes a zone of locked-out memory addresses, completes the instruction cycle of said instruction word. This is recognized by the Control Section which causes the program sequence to continue by calling out the next subsequent program instruction word from the Memory Section. Assuming this instruction word is the Store X instruction word described above, it is placed in the Function Register in the same manner as previously described and the function code portion thereof contained in *f* is translated and recognized and a signal in accordance therewith is applied to the Control Section. The Control Section develops control signals to enable the transmission paths $F_{0b}$ to $S_0$, $Z_{0L}$ to $W_1$ as well as an initiate control memory signal to cause an address modifier to be transmitted from an address location in the Control Memory Section designated by the *b* designator of the instruction word, to the $W_1$ Register. Substantially concurrently therewith, the *u* portion of the corresponding instruction, which in the example is the binary number

0101000000000000 is transmitted from the Function Register to the $W_3$ Register via the transmission path $F_{0L}$ to $W_3$. To simplify the description it will be assumed that the address modifier transmitted to the $W_1$ register is zero so that no address modification occurs and the unmodified designating portion of the Store X instruction word is transmitted via the Index Adder to the R Register when the transmission path IA to R is enabled by the Control Section. The binary values of the bits contained in the R Register stages 11–14, which are respectively 0, 1, 0, 1 (equal to decimal 10) are transmitted to the Compare Circuit 76 via the transmission path R to Compare. Substantially simultaneously therewith the entire contents of the address designating word in the R Register are transmitted to the $S_1$ Register via the enabled transmission path to designate a particular address location in the Memory Section 13 which contains information which is to be altered. The upper and lower limit defining portions of the number in the MLO Register 74 are each compared to the four bits transmitted from the R Register in the Compare Circuit 76. Since the decimal value of said latter four bits is equal to ten, which is outside the zone of addresses which can be written into, the signal output line 78 from the Compare Circuit does not receive a signal to enable AND circuit 80. Therefore, even though the Control Section develops a write signal on line 82 to initiate the Memory Section initiation of the memory is inhibited.

The reason for comparing the bits in stages 11–14 of the R Register to the limit defining numbers in the MLO Register is that in the particular computing device incorporating this invention it was found advantageous to have the zone of locked-out addresses alterable in blocks of 2,048 addresses ranging from address 2,048 through 32,768. As previously described the particular computing device of FIG. 1 actually includes 65,536 addressable memory locations which is achieved by using two banks of Memory Sections each one containing 32,768 registers. Since the bank designation is via the binary value of the sixteenth bit of the address designating portions of the instruction word the determination of which of the banks should be inhibited when the instruction word is referencing a locked-out address is determined by sensing the state of the sixteenth bit of the R Register. Furthermore the two banks may have different zones of locked-out addresses and this can be established by placing the proper binary values in the remaining eight bits of the address designating portion of the memory lockout instruction word and placing this in the MLO Register as previously described. In other words, it can be seen that this invention can be expanded to lock out certain different zones of addresses in separate addressable portions of a Memory Section.

*Logic circuits (FIGS. 4–8)*

The basic logical element which is utilized in the embodiment of this invention is a NOR circuit which is represented by a rectangular block as shown in FIGURE 4. The truth table for the NOR circuit is shown in FIGURE 5 and logically describes the NOR as outputting a "0" if any input thereto is a "1" while outputting a "1" only if all of the inputs are "0's." The electrical circuitry of a typical NOR circuit is shown in FIGURE 6 and comprises diode OR inputs into a single transistor amplifier-inverter, the operation of which is well known in the art. In the illustrative circuit of FIGURE 6, a "1" is represented by a D.C. voltage level of approximately ground or zero potential and a "0" is represented by a D.C. voltage of approximately −3 volts. This, of course, is only exemplary and not limitive and is a matter of choice depending upon the type of circuitry of said logic element. In the figures each of the inputs into a NOR logical element, where more than a single input is utilized, is represented by an individual input line thereto.

Flip-flops are represented in the figures by square blocks, as shown in FIGURE 7. Actually the flip-flop comprises a pair of cross-coupled NOR logical elements as illustrated in FIGURE 8. Each of the flip-flops contains a 1 and a 0 input side and a corresponding 1 and 0 output side. When in the "0" state the flip-flop outputs a "1" from the 1 side and a "0" from the 0 side, while in the "1" state the flip-flop outputs a "0" from the 1 side and a "1" from the 0 side. Stating this in terminology utilizing set and reset conditions, the flip-flop outputs a "0" from the 1 side when in the set condition and a "0" from the 0 side when in the reset or cleared condition. To set the flip-flops, a "1" is fed into the 1 or set input while to clear or reset the flip-flop, a "1" is fed into the 0 or clear input side. In any of the figures a plurality of OR inputs into either of the input sides of the flip-flop is shown as multiple inputs into a block symbol appropriately labeled OR and only a single input from the OR input to the flip-flop is shown. In the figures, NOR circuits are designated by a letter and four digit indication while flip-flops are designated by a letter with an accompanying three digit designation.

*MLO register (FIGURE 9)*

Figure 9:
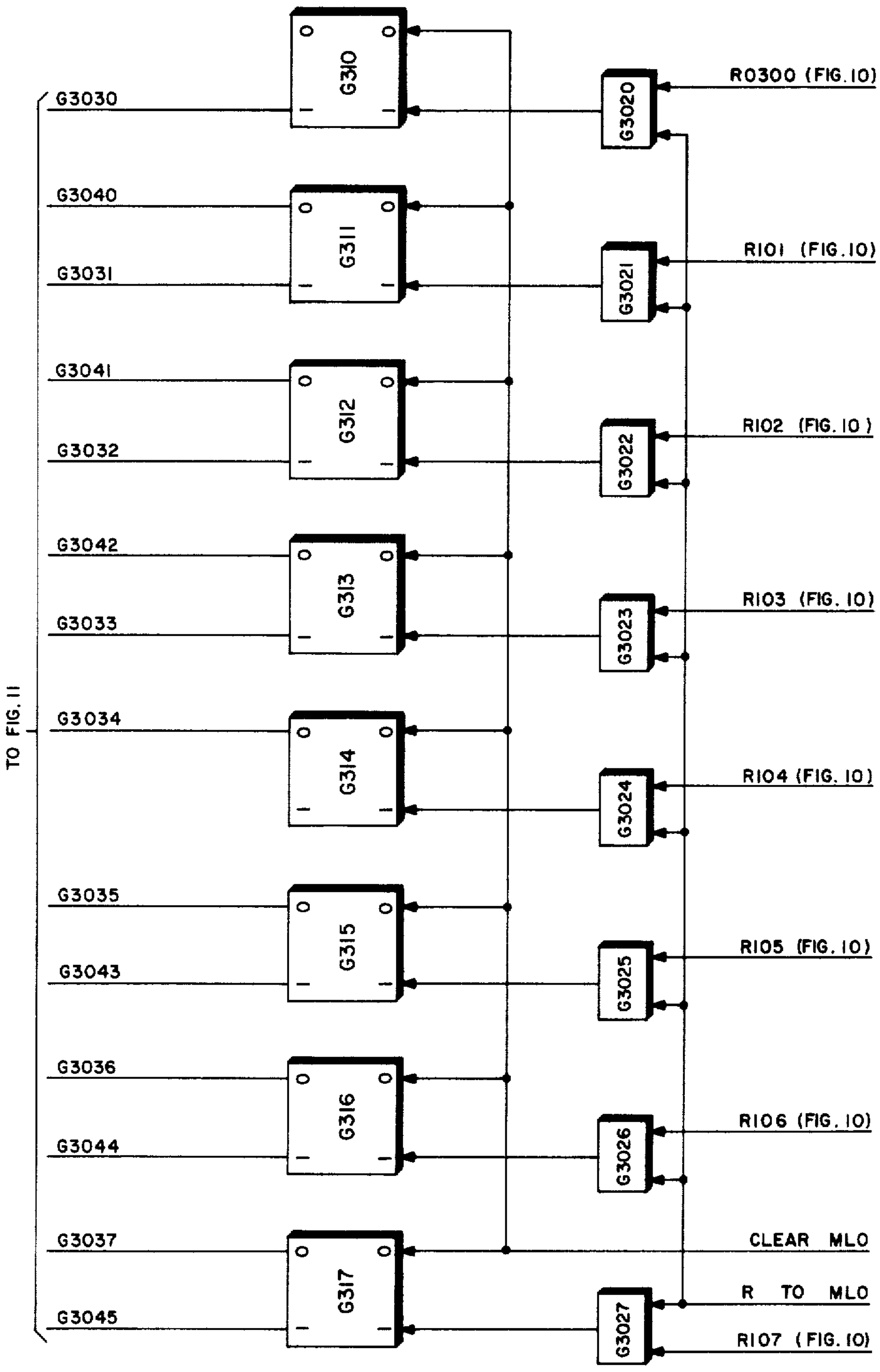
FIG. 9 is a block diagram of a portion of the Memory Lookout Register.

The eight flip-flops enclosed by broken line in FIGURE 9, G310–G317 represent the eight lowest order stages of the MLO Register with G310 being the lowest order stage. The transmission path input from the R Register to the MLO Register, shown in FIG. 1, or the eight lowest order bits appear as the eight input lines in the vertical direction at the bottom of FIGURE 9 and each of said input lines is labeled in accordance with its origin which is a corresponding digit order position in the R Register. The transmission path is dated by the control signal input labeled R to MLO which provides a first input to each of the NOR circuits G3020–G3027. The other input to the respective latter NOR circuits is from the corresponding digit order of the R Register. The output of each of said NOR circuits is transmitted to the 1 or set input side of the respectively corresponding digit order stages of the MLO Register flip-flops. The transmission from R to MLO is enabled only when the control signal line labeled R to MLO has a "0" signal level thereon so that the input to the respective MLO Register flip-flops will be in accordance with the binary value of the corresponding state of the R Register. Output signal indications of the binary value of the respective stages of the MLO Register appear on the vertically orientated output lines at the top of FIG. 9 which are labeled in accordance with their destination in the Compare Circuit of FIG. 11. The input to the 0 side of each of the MLO Register stages, labeled Clear MLO, provides the means for clearing all of the flip-flops prior to the transmission of information to the R Register.

*R register (FIGURE 10)*

Figure 10:
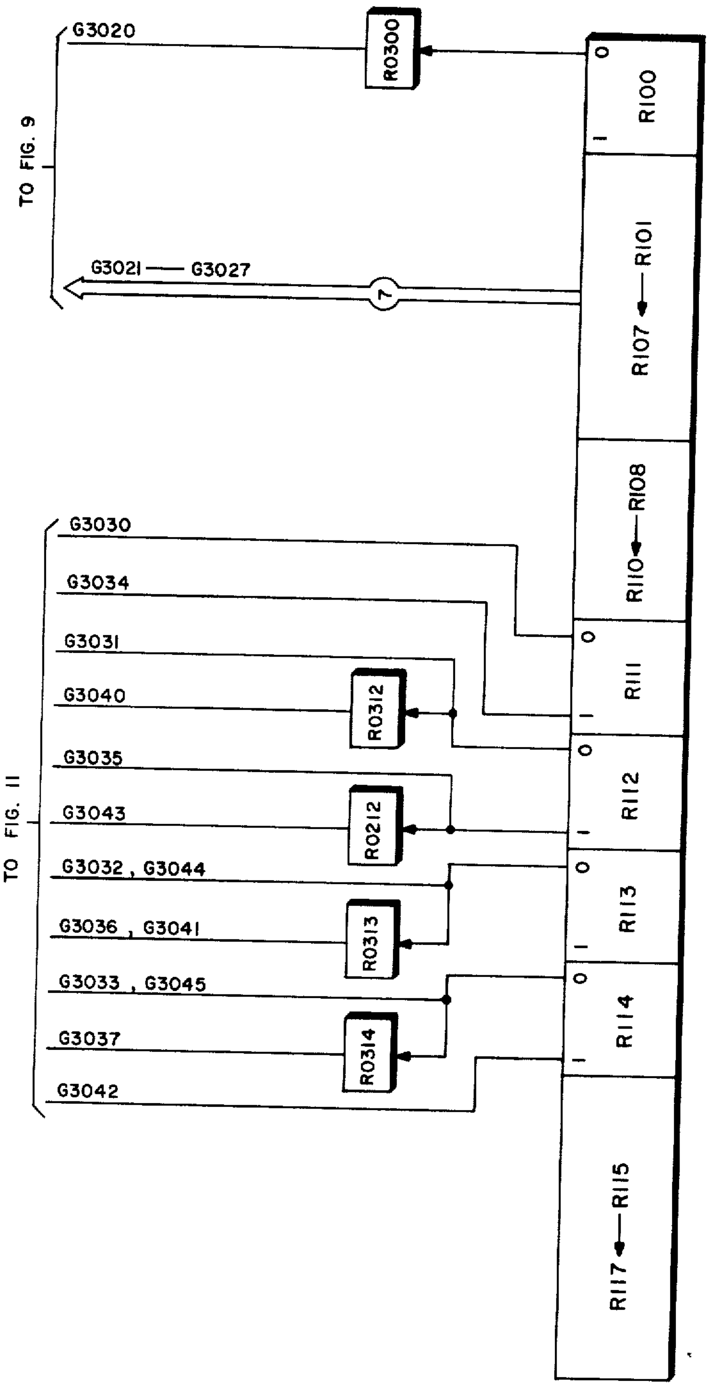
FIG. 10 is a block diagram of a portion of the R Register.

Referring now to FIG. 10 the lowest order stage of the R Register is shown as flip-flop R100; the next seven higher order stages are shown collectively as R101–R107; R108–R110 are shown collectively as a group; R111–R114 are shown as individual flip-flops; and R115–R117 are also shown collectively. The 1 output side of the lowest order stage of the R Register, R100, is inverted through NOR circuit R0300 and the output from the latter provides the input to the lowest order stage of the MLO Register, G310 of FIG. 9, via the indicated NOR G3020. The transmission of the information contained in stages R101–R107 is effected in an identical manner, that is with the 1 output side being inverted. For clarity, this is not shown in the figure. Although in general all of the bits of the R Register are transmitted to the MLO Register since the operation of the instant invention can be adequately described utilizing the lower eight bits which define a zone of locked-out addresses, the transmission of the remaining bits of the R Register to the MLO Register is not shown in the figures.

Figure 11:
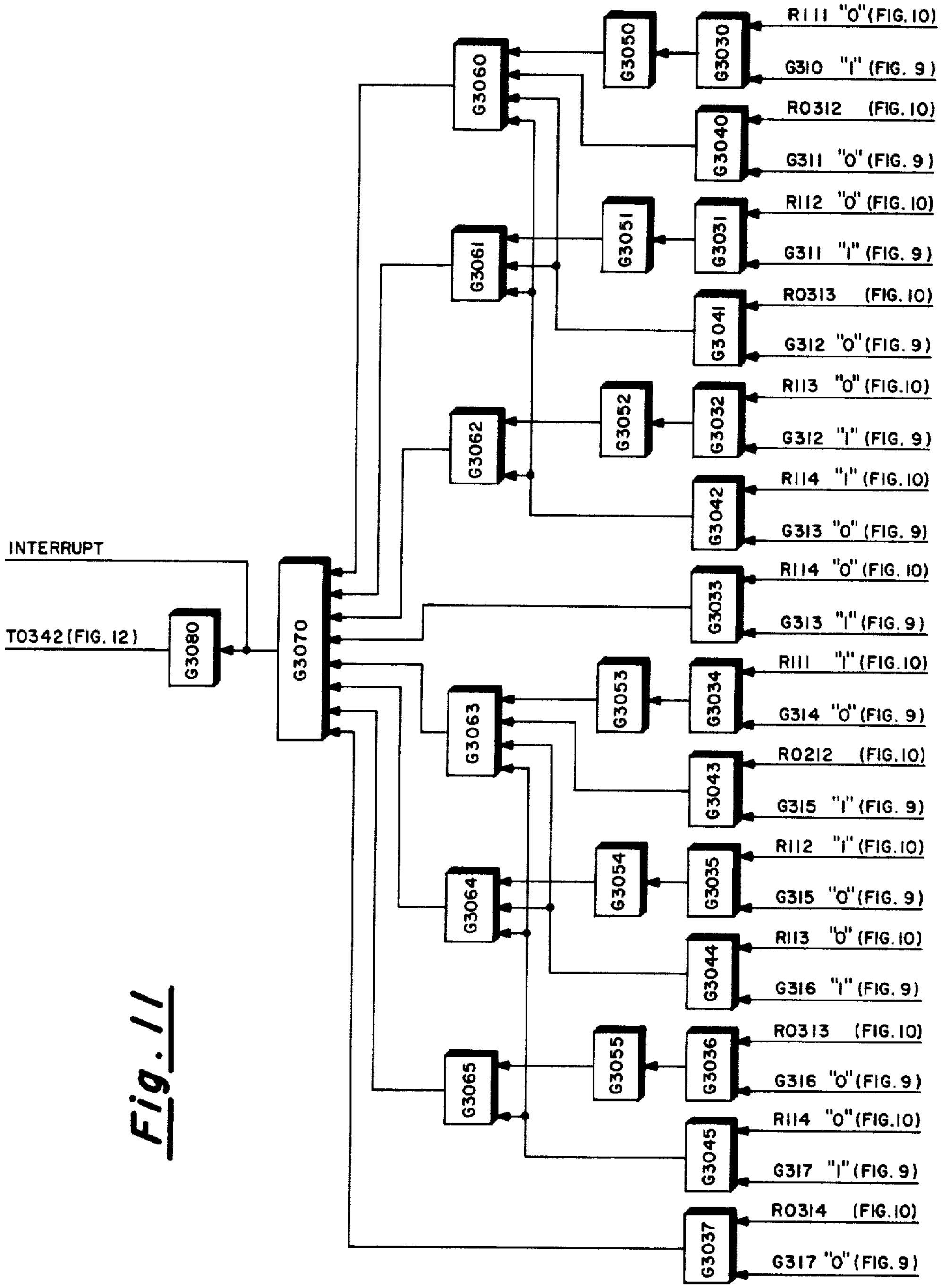
FIG. 11 is a block diagram of a portion of the Compare Circuit.

Signal indications of the binary value of stages R111–R114 are developed as shown to provide a set of inputs to the Compare Circuit of FIG. 11. As previously stated, in the instant embodiment of this invention only these four bits of the address indicating portion of a memory alteration instruction word are compared to the established zone of locked-out addresses since it is desired to lockout the addresses in groups of 2,048 addresses. Signal indications from the 1 and 0 output sides of stage R111 are transmitted directly to the input of the Compare Circuit of FIG. 11 and the destination in FIG. 11 is labeled on the respective output lines. The 1 output side of stage R112 and the 0 output side of the same stage are respectively inverted through NOR circuits R0212 and R0312 in addition to being directly transmitted to the Compare Circuit. In a similar manner the 0 output side of R113 and R114 are inverted through the respective NOR circuits R0313 and R0314 as well as being directly coupled to the Compare Circuit.

*Compare Circuit (FIGURE 11)*

The illustrative Compare Circuit of FIG. 11 is essentially a subtracter. The function of the circuit is to compare the lower four bits of the MLO Register to bits 11–14 of the R Register to determine if the address which is designated in part by said four bits of the R Register, is below the lower limit of the established zone, as designated by the four lowest order bits of the MLO Register. If such is the case the Compare Circuit recognizes that the memory access is to a locked-out address and so develops the signal to inhibit the memory reference. If the reference address is equal to or greater than the lower limit no inhibiting signal results from the lower limit check. However, concurrent with the comparison to the lower limit the Compare Circuit compares the same four bits of the address-designating portion of the instruction word to the previously established upper limit which is designated by the contents of stages G314–317 of the MLO Register. If the reference address is greater than the upper limit it is within the zone of locked-out addresses and therefore the comparison circuit develops an inhibiting signal to prevent the memory access to said address. In the illustrative embodiment shown in FIG. 11, the lower four bits of the MLO Register contained in stages G310–G313, are subtracted from the contents of stages R111–R114 and if this subtraction results in an end around borrow it indicates that the referenced address is within the zone of locked-out addresses and a signal indication thereof is generated by the Compare Circuit. Concurrently therewith the same four bits of the R Register are subtracted from the contents of the MLO Register stages G314–317 and the generation of an end around borrow from said latter subtraction also results in an inhibiting signal since this likewise indicates that the referenced address is within the zone of locked-out addresses. Only when both subtractions result in no end around borrows is the memory allowed to be initiated. The operation of the Compare Circuit of FIG. 11 can best be described by using some examples.

Using the coded permutations of the instruction words described in the section of this specification titled Program Instruction Words, the lower four bits of the MLO Register are set to values such that they combine to equal decimal seven and the next higher four bits, stages G314–G317 are set to values such that they combine to equal decimal nine. This sets the lower and upper limits respectively to seven and nine. Additionally, stages R111–R114 are respectively set to binary values of 0, 1, 0 and 1 equal to decimal ten. G3030 receives a "0" binary signal representation from the 0 output side of R111 since the latter is in the "0" state. The second input to G3030 is also a signal representation of binary "0" from the 1 output side of G310 since the latter is in the "1" state. These combine to input to G3050 a binary "1" signal which in turn is inverted in G3050 and appears as a binary signal "0" representation as one of the four inputs to G3060. The binary "1" signal from the 0 output side of R112, which is in the "1" state, inverted through R0312 appears as a "0" signal input to G3040 and a binary "1" signal representation from the 0 output side of G311 appears as the second input to G3040. In response thereto G3040 inputs a binary "0" signal representation as a second input to G3060. By tracing through in a similar manner the binary signal inputs from the MLO Register stages G310–313 and the corresponding stages R111–R114 of the R Register it can be determined that the rightmost four inputs to G3070 are each of a binary "0" signal representation and, assuming these were the only inputs to G3070, would cause the latter to output a signal representation of a binary "1" which in turn is inverted through G3080 to develop a binary "0" signal representation on its output line which is labeled in accordance with its destination at T0342. The interrupt signal line from G3070 receives a binary "1" signal representation. These signal conditions, as recognized by the computing device, indicate that no end around borrow resulted from the subtraction of the four bits of R from the four bits of MLO, since the reference memory address is greater than the lower limit. The binary signal representations from these same four bits of the R Register and from bits G314–317 of the MLO Register which are transmitted to the Compare Circuit of FIG. 11 to effect a test to determine if the memory reference address is greater than the upper limit can be traced in the manner previously described to show that at least one of the four additional inputs to G3070 is of a binary "1" signal representation since the reference address is greater than the upper limit of the zone. This indication of a generated end around borrow causes G3070 to output a "0" signal representation on the interrupt line and further results in G3080 outputting a binary "1" signal representation. This latter condition indicates that the memory reference address is within the zone of locked-out addresses. The utilization of the signal output of G3080 to effect inhibition of the memory control signal will be subsequently described.

*Control Section (FIGURE 12)*

Figure 12:
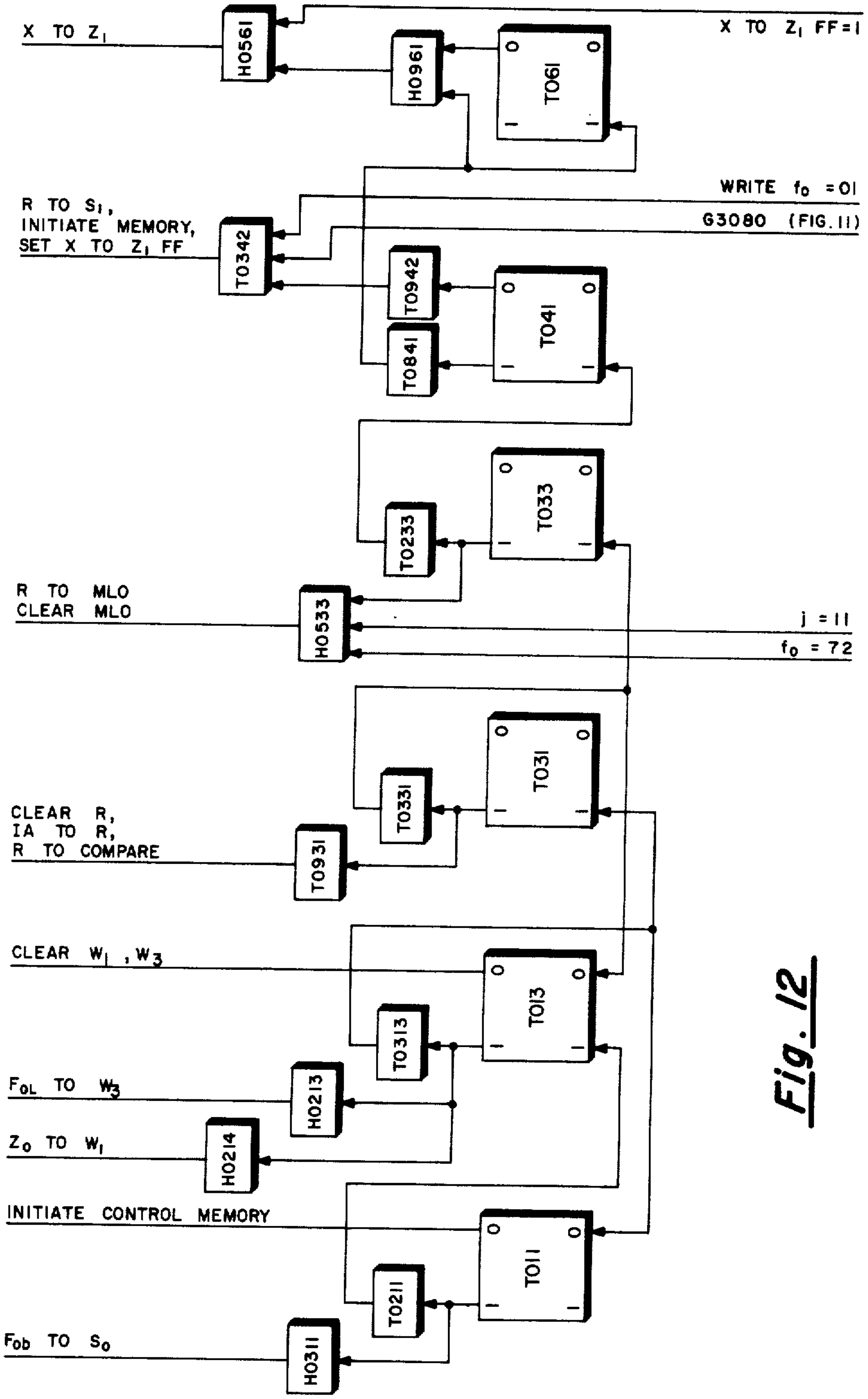
FIG. 12 is a block diagram of a portion of the Control Section.

FIG. 12 shows some of the pertinent detailed portions of the Control Section 18 for developing the control or command signals to which the computing device operatively responds. Although not shown, timing is provided by a source of clock pulses to the flip-flops and the NOR circuits of the Control Section so that the command signals appear in their proper sequence. For purposes of explanation it can be assumed that the sequence of occurrence of these command signals and the propagation of the main control pulse is from left to right in FIG. 12. The vertical lines at the top of the figure are the output command signal lines and include some subcommand signal lines, while the input lines at the bottom of the figure provide conditioning signal inputs. In general the particular control or command signal is effective when its labeled output line is in the binary "1" state however, in some instances a binary "0" signal activates the control signal line. In general, the conditioning signal input lines are active when carrying a binary "0" signal. Assume that initially the leftmost flip-flop G011 is set and the remaining five flip-flops are cleared. The operation of the illustrative section of the Control Section can best be understood by continual cross-reference to FIGS. 1–3 to visualize the necessity for the various control signals as they are developed. It should further be assumed that initially the $F_0$ Register 28 contains the instruction which is to be utilized to establish the zone of locked-out addresses.

The "0" binary signal from the 1 output side of T011 is inverted via H0311 and appears as a signal to enable the $F_{0B}$ to $S_0$ transmission path. Substantially simultaneously therewith the binary "1" signal from the 0 output side of T011 initiates the Control Memory section at the address as designated by the *b* designator of the instruction word. Additionally the signal from the 1 output side of T011 through T211 sets the next adjacent flip-flop T013. T013, in turn from its 1 output side and via H0214 and H0213 respectively provides control signals to enable the transmission paths $Z_0$ to $W_1$ and $F_{0L}$ to $W_3$ and a control signal from its 0 output side of Clear $W_1$, $W_3$. Furthermore, via T0313 a signal is fed back to the 0 input side of T011 to clear it so that only a single main control pulse propagates through the Control Section. It can be seen, continuing through flip-flop T031, that in a similar manner the control signals IA to R, Clear R, and R to Compare are generated as the main control pulse propagates through the Control Section. The conditioning signals of $f_0=72$ and $j=11$ at H0533 are of course, present since this is the function code portion and the *j* portions of the instruction word in the F register and so the control signal Clear MLO as well as R to MLO are developed. The remaining control signals are developed in a similar manner. It should be noted that the conditioning signal inputs to T0342 are a combination of the state of G3080 (of FIG. 11) and a signal labeled "write" with $f_0=01$. When these conditioning signals are present the control signals of set X to $Z_1$ Flip-Flop, Initiate Memory, and R to $S_1$ are generated. Obviously then the "write" signal is the signal to initiate the memory in response to an instruction word which comprehends altering the memory contents and the G3080 conditioning signals indicates whether the memory address to be referenced is a locked-out address as determined by the Compare Circuit of FIG. 11. Obviously then not all of the control signals shown are necessary for the two particular instruction words utilized herein for illustrative purposes and furthermore it is obvious that additional control signals are required, but not shown, for calling out the program instruction words in continuous proper program sequence. FIG. 12 is only intended to briefly illustrate an exemplary Control Section for implementing the instant invention.

It should be noted that the means for inhibiting the initiation of the memory reference is shown and described differently in FIG. 1 from that described in relation to the Control Section of FIG. 12. In the former figure it is shown that the write signals which normally initiates the memory appears as input 82 to AND circuit 80 and is there ANDed with the output from the Compare Circuit 76 which appears as the input on line 76. In the immediately foregoing description of the Control Section it is shown where the memory initiate signal is inhibited in the Control Section by causing the initiate memory control signal output line from T0342 to be dependent upon the signal received from G3080 in the Comparator Circuit of FIG. 11. This serves to illustrate that the actual implementation of this invention may be a matter of choice dependent upon the particular type of computing device in which it is incorporated.

Means for developing the five conditioning signal inputs to the Control Section of FIG. 12 should be obvious to anyone of ordinary skill in the art and, therefore, it is deemed not necessary to include structure in the figures to show the development of said conditioning signals. Means for translating the coded permutations of the operation code and the $j$ designator to obtain the respective conditioning signals of $f_0=72$, $f_0=01$ and $j=11$ are well known in the art. The conditioning signal inputed to T0342 from G3080 of FIG. 11 was previously described. The final conditioning signal inputed to the illustrative Control Section of FIG. 12 is that of X to Z1 $FF=1$ and this need only be a signal output from a flip-flop indicating the state of the flip-flop. The X to Z1 $FF=1$ conditioning signal is dependent upon the flip-flop having previously been set to the "1" state by a control signal output from T0342. This conditioning signal is included in the illustrative Control Section only because the particular illustrative instruction word utilized to describe the operation of the invention included the transmission of information from the X Register to the Z1 Register to be stored in the Memory Section. Obviously, if the information to be stored in the Memory Section were to come from some other register or some other section of the computing device different conditioning signals would be required.

It is understood that suitable modifications may be made in the structure and the method as disclosed provided such modifications come within the spirit and scope of the appended claims. Having now, therefore, fully illustrated and described our invention, what we claim to be new and desire to protect by Letters Patent is set forth in the appended claims:

1. For a digital computer of the internally stored program type, the improvement comprising the combination of: a memory section for storing manifestations indicative of machine instruction words and operands in a multiplicity of addressable memory registers, some of the instruction words comprising at least a coded operation portion and a coded memory-address designating portion; writing circuit means for selectively altering the stored contents of the memory section; program control means for calling out certain of the instruction words from the memory section in a predetermined program sequence; function register means coupled to said memory section for receiving each called out instruction word and for holding said words for at least an instruction cycle; decoding means coupled to said function register for translating the coded operation portion of each instruction word, said decoding means including means for developing a first signal output when the operation portion is of a first predetermined code and a second signal output when the operation portion is of a code which designates alteration of the memory contents; a memory lockout storage register for storing manifestations indicative of selected memory address ranges in which alteration of the stored data manifestations will be prohibited; means coupled to said decoding means and responsive in part to said first signal for enabling the transmission of the memory-address designating portion of the corresponding instruction word to said storage register; means coupled to said storage register and said function register means for comparing at least in part the memory-address designating portion of each instruction word received by said function register to the contents of said memory lockout storage register, said comparing means including means for developing an inhibit signal output when said compared values have a certain predetermined relationship; gated circuit means electrically coupled intermediate said decoding means and said writing circuit means for initiating said writing means in response to said second signal output from the decoding means; and means coupled to said comparing means for disabling said gated circuit means in response to said inhibit signal.

2. For a digital computer, in combination: A memory section for storing manifestations indicative of selectively alterable machine instruction words and operand words in a multiplicity of addressable memory registers; some of said instruction words comprising at least a coded operation portion and a coded memory-address designating portion; a function register adapted to receive certain ones of said instruction words from the memory section in a program sequence; decoding means coupled to the function register for developing a first signal indication when the operation portion of any of the respective instruction words is of a first predetermined code; a memory lockout storage register for storing manifestations indicative of selected memory address ranges; control means responsive in part to said first signal for enabling at least in part the transmission of the memory-address portion of the corresponding instruction word to a storage register; means for comparing the contents of said memory lockout storage register at least in part to the memory-address portion of the instruction words received by said function register and for developing an inhibiting signal output when said compared quantities have a certain predetermined relationship to one another; memory writing means for altering words stored in the memory section; said decoding means including means for developing a second signal when the operation code of an instruction word designates a writing operation; gate means coupled to said means for developing a second signal and responsive in part to said second signal for initiating said memory writing means; and means coupled to said comparing means for disabling said gate means in response to said inhibiting signal.

3. In a digital computer of the internally stored program type having a memory section for storing program instruction words and operands in a multiplicity of addressable memory registers, with at least some of the instruction words comprising a coded operation-designating portion and a coded memory-address-designating portion, and further including means for selectively altering the contents of the memory section as called for by the operation-designating portion of some of the respective instruction words in memory registers designated at least in part by the address-designating portion of the corresponding instruction word, and still further including a function register for receiving instruction words from the memory section in a program controlled sequence, the improvement comprising in combination:

(A) a decoding circuit coupled to the function register for developing a first signal output when the operation-designating portion of an instruction word in the function register calls for alteration of memory contents and a second signal output when the operation-designating portion is of a different predetermined code;

(B) gated circuit means coupled to said decoding circuit for activating the means for altering the memory contents in response to said first signal when operatively enabled;

(C) memory lockout storage register means for storing manifestations indicative of selective memory address ranges;

(D) means adapted to receive the second signal output from the decoding circuit for enabling the transmission of the address-designating portion of the corresponding instruction word from the function-register to said memory lockout storage register;

(E) means for receiving manifestations from said memory lockout storage register and the function register for comparing at least in part the address-designating portion of each instruction word received by the function register to the contents of said memory lockout storage register, including means for developing an inhibiting signal output when said compared quantities have a certain predetermined relationship;

(F) and means for applying said inhibiting signal to said gated circuit means for disabling said latter means.

4. For a digital computer which is operatively controlled by a programmed series of machine instruction words, the combination of: memory means for storing a plurality of instruction words having at least a coded function portion and an address-representing portion stored in addressable registers of said memory section, the function code portion of at least one of said words designating the function of altering the contents of the memory register; function register means for at least temporarily storing instruction words; means for transmitting each of the instruction words from said memory section to the function register in a program sequence; decoding means coupled to said function register for developing a first signal output when the function code portion of any of the respective instruction words is of a first predetermined code and for developing another signal output when the function code portion of any of the respective instruction words designates an alter-memory function; a further storage register; means responsive to the first signal output from said decoding means for transmitting at least in part the address-designating portion of the corresponding instruction word to said further storage register; means responsive to said another signal output from said decoding means for initiating the alter-memory function at the memory address designated at least in part by the address-representing portion of the corresponding instruction word; means for comparing said latter address to the contents of said further storage register and for developing a signal output when said compared quantities have a predetermined relationship; and means responsive to said latter signal output for disabling said memory-altering means.

5. In a digital computer having a memory with addressable registers containing instruction and data signals and operating in one of a plurality of sequences of instruction signals:

(A) lockout means responsive to a first set of instruction signals for establishing signals indicating a zone of addresses identifying selected ones of the memory register, (B) control means responsive to a second set of instruction signals, said second set having an address portion and a portion for enabling the altering of the pattern of signals in an addressable memory register, as designated by said address portion, (C) comparison means coupled to said lockout means and said control means for receiving the zone signals for comparing the address of the register to be addressed by said control means with the zone signals for providing at least two alternative indicating signals respectively indicating the addressed register is one or not one of the selected memory registers, (D) sequence-branching means coupled to said comparison means and responsive to one of said two alternative indicating signals for interrupting the sequence of instruction signals and causing a different sequence of instruction signals to be executed, said sequence-branching means including means for inhibiting the alteration of signal patterns in the addressed register, and responsive to a different one of said two alternative indicating signals to permit the alteration of the signal pattern, (E) and each sequence of instructions being permitted to contain one or more of said first sets of instruction signals.

6. A selective branch operation for a digital computer having:

(A) a memory with a plurality of addressable registers capable of operating under control of a sequence of instruction signals, (B) branch indicating means responsive to a first set of instruction signals for selectively providing a set of branch-indicating signals associated with selected ones of the addressable memory registers indicated by the first set signals, (C) computer operating means responsive to a second set of instruction signals for initiating a computer operation to alter a signal pattern stored in a memory register at an address indicated at least in part by the second-set signals, (D) comparison means for receiving the branch-indicating signals and the second-set register indicating signals for comparing them to provide two alternative result signals respectively indicating a match and mismatch, (E) sequence-branching means coupled to said comparison means and responsive to a first one of the result signals for (a) inhibiting the alteration of the signal pattern in the second-set-signal indicated register and (b) initiating a new sequence of instruction signals and further responsive to a second one of the result signals for permitting alteration of said signal pattern.

References Cited by the Examiner

UNITED STATES PATENTS 2,959,351 11/1960 Hamilton --------- 340—172.5

ROBERT C. BAILEY, *Primary Examiner.*

P. J. HENON, *Assistant Examiner.*